UNITED STATES PATENT OFFICE.

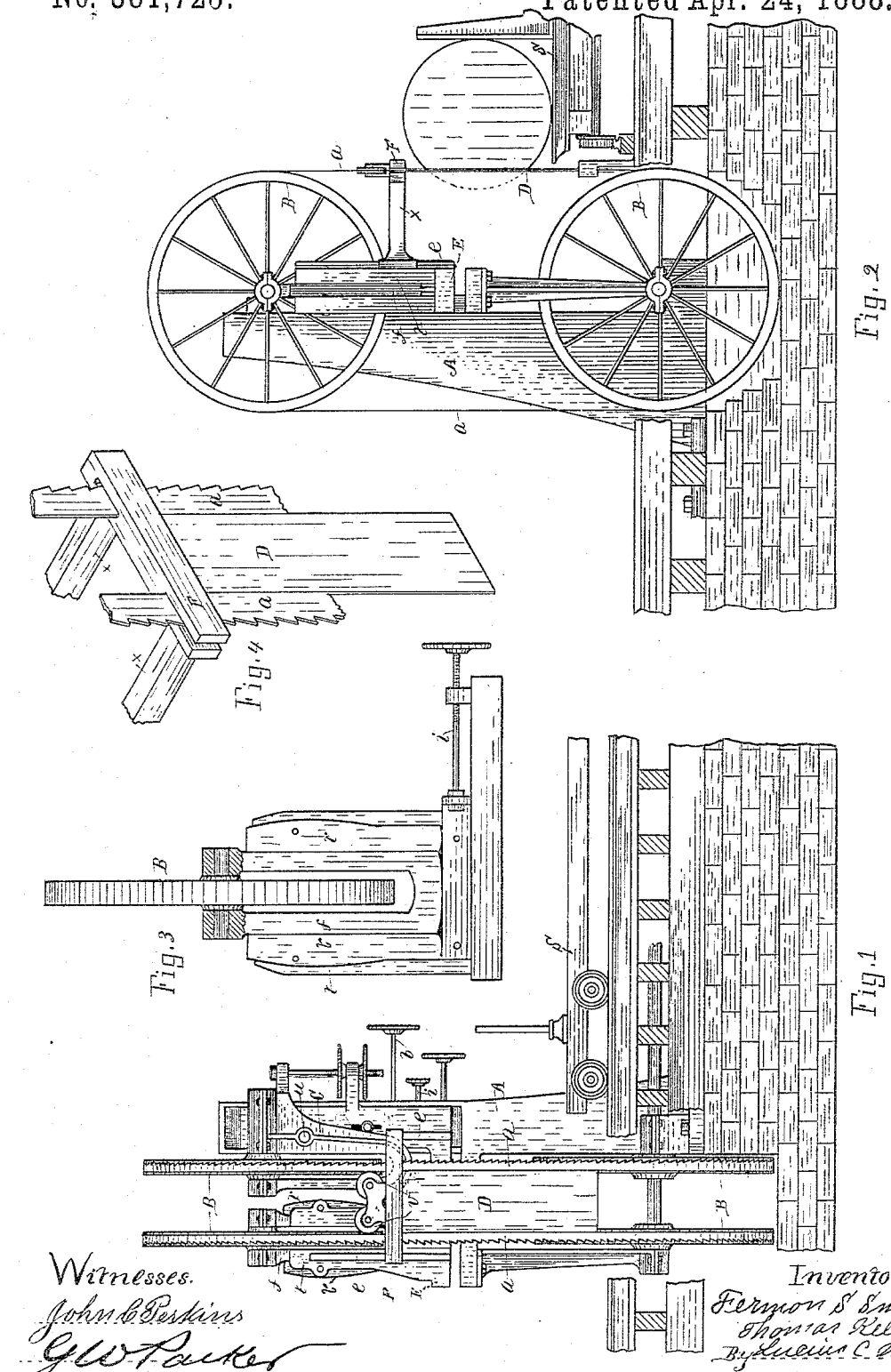

FURMON S. SMITH AND THOMAS KELLY, OF DIAMOND LAKE, MICHIGAN.

BAND-SAW MILL.

SPECIFICATION forming part of Letters Patent No. 381,726, dated April 24, 1888.

Application filed August 2, 1887. Serial No. 245,907. (No model.)

*To all whom it may concern:*

Be it known that we, FURMON S. SMITH and THOMAS KELLY, the former a citizen of the United States, and the latter of Ireland, both residing at Diamond Lake, county of Newaygo, State of Michigan, have invented a new and useful Band Sawing-Machine, of which the following is a specification.

The objects of this invention will appear in the following description and claims.

In the drawings forming a part of this specification, Figure 1 is a front elevation; Fig. 2, an end elevation looking from a point at the left of Fig. 1; Fig. 3, an enlarged lettered detail of Fig. 1, with part in section; and Fig. 4 is an enlarged perspective of lettered details below described.

Referring to the lettered parts of the drawings, A is an upright frame or standard which supports the axial bearings of pulleys B, much in the same manner as heretofore in machines employing a single band-saw.

We employ two sets of separated pulleys, two in a set, one above the other, each set bearing a band-saw, $a$, the backs of said saws being toward each other, Figs. 1 and 4. The guide F bears two rollers, $v$, for the back of the saws to contact with, one for each saw, Fig. 1, during the operation of sawing the log carried by the carriage S. When the carriage has passed the saws in one direction, the log is moved the thickness required for the next board, and the latter is sawed from the log by the other saw during the reverse transit of the carriage. The arms $x$ of the guide $v$ are grooved at the end and slide adjustably on the bars $e$.

The forked support C to the bearings of one of the upper pulleys is fulcrumed at $u$, so that by means of hand-wheels $b$ the pulley, if desired, may be slightly deflected to slant the saw. The other upper pulley, Fig. 3, has bearings supported by the fork $f$. This fork is detachably inserted in a frame consisting of the bars $r$, pivoted to the supports $t$ and pivotally attached to a sliding block operated by hand-screw $i$. By this means of construction the other upper pulley may be deflected as desired. Other suitable means may be employed to deflect or tilt the pulleys as different circumstances may require.

The guide F has a pendent plate, D, between the saws $a$, Figs. 1 and 4, to fill the space between the same at the point where the sawing is done, and, if deemed of advantage, the plate may be of a width to cause the saws to come in contact with the edges of the same.

There are certain features herein illustrated not necessary to describe, and there are many details in the construction of such a machine not here illustrated and which are subject to change and will be readily understood by those skilled in the use of single band saws. We have aimed to illustrate sufficiently to show the principle of employing two band-saws so as to saw during each passage of the log-carriage in either direction.

Having thus described our invention, what we claim, and desire to secure by Letters Patent, is—

1. In combination, a log carriage, the upright frame, the pulleys, the saws back to back upon said pulleys, the sliding guide having rollers mounted thereon between the saws and the plate pendent from said guide and arranged to fill the space between the saws where the sawing is done, substantially as set forth.

2. In a band sawing-machine, the combination of the upright frame, the upper and lower sets of pulleys bearing the saws, the sliding block and screw, the upright standards pivoted to said block at their lower ends and pivoted to the frame-work of the machine near their upper ends, and the forked support detachable between said pivoted standards, one of the upper pulleys being mounted in bearings on said pivoted support, substantially as and for the object stated.

In testimony of the foregoing we have hereunto subscribed our names in presence of two witnesses.

FURMON S. SMITH.
THOMAS KELLY.

Witnesses:
SAMUEL B. SMITH,
L. H. FOSDIC.